(12) United States Patent
Wang et al.

(10) Patent No.: US 7,157,521 B2
(45) Date of Patent: Jan. 2, 2007

(54) SOFT GEL COMPOSITIONS FOR HOT ADHESION

(75) Inventors: Xiaorong Wang, Hudson, OH (US); Victor Foltz, Akron, OH (US); James E. Hall, Mogadore, OH (US)

(73) Assignee: Bridgestone Corporation, Tokyo (JP)

( * ) Notice: Subject to any disclaimer, the term of this patent is extended or adjusted under 35 U.S.C. 154(b) by 132 days.

(21) Appl. No.: 10/468,051

(22) PCT Filed: Feb. 15, 2002

(86) PCT No.: PCT/US02/04562

§ 371 (c)(1),
(2), (4) Date: Aug. 13, 2003

(87) PCT Pub. No.: WO02/064677

PCT Pub. Date: Aug. 22, 2002

(65) Prior Publication Data

US 2004/0082693 A1    Apr. 29, 2004

Related U.S. Application Data

(60) Provisional application No. 60/269,138, filed on Feb. 15, 2001.

(51) Int. Cl.
- C08L 9/06 (2006.01)
- C08L 23/28 (2006.01)
- C08L 25/00 (2006.01)
- C08K 5/09 (2006.01)
- C08K 5/092 (2006.01)

(52) U.S. Cl. ............ 525/232; 525/240; 524/575; 524/322; 524/321; 524/284; 524/296; 524/474

(58) Field of Classification Search ........ 525/232, 525/240; 524/474, 284, 296, 575, 322, 321, 524/874
See application file for complete search history.

(56) References Cited

U.S. PATENT DOCUMENTS

| | | | |
|---|---|---|---|
| 4,900,770 A | 2/1990 | Tomita et al. ........... 524/274 |
| 5,037,885 A | 8/1991 | Mori et al. ........... 525/92 |
| 5,300,569 A | 4/1994 | Drake et al. ........... 525/78 |
| 5,574,257 A * | 11/1996 | Brauer et al. ........... 174/76 |
| 5,618,882 A | 4/1997 | Hammond et al. ........ 525/92 D |
| 5,760,117 A * | 6/1998 | Chen ........... 524/270 |
| 5,910,530 A * | 6/1999 | Wang et al. ........... 524/534 |
| 5,910,540 A | 6/1999 | Takahashi ........... 525/92 B |
| 5,925,707 A | 7/1999 | Shafer et al. ........... 524/490 |
| 6,048,930 A * | 4/2000 | Wang et al. ........... 525/66 |
| 6,054,532 A | 4/2000 | Wang et al. ........... 525/66 |
| 6,133,354 A * | 10/2000 | Wang et al. ........... 524/268 |
| 6,204,354 B1 | 3/2001 | Wang et al. ........... 528/310 |
| 6,350,800 B1 * | 2/2002 | Wang et al. ........... 524/320 |
| 2003/0100662 A1 * | 5/2003 | Wang et al. ........... 524/504 |

FOREIGN PATENT DOCUMENTS

| | | |
|---|---|---|
| EP | 0 955 329 A1 | 11/1996 |
| EP | 0 879 831 A1 | 11/1998 |
| EP | 0 879 832 A1 | 11/1998 |
| EP | 0 955 319 A1 | 11/1999 |

OTHER PUBLICATIONS

"Long-Range Order in Physical Networks of Gel-Forming Triblock Copolymer Solutions" by Kleppinger et al., *Journal of Polymer Science: Part B: Polymer Physics*, vol. 37, 1833-1840, (1999).

"Modification of a Thermoplastic Elastomer Gel through the Addition of an Endblock-Selective Homopolymer", by Jackson et al., *Journal of Polymer Science: Part B: Polymer Physics*, vol. 37, 1863-1872, (1999).

* cited by examiner

*Primary Examiner*—David W. Wu
*Assistant Examiner*—Rip A. Lee
(74) *Attorney, Agent, or Firm*—Arthur M. Reginelli; Meredith E. Palmer

(57) ABSTRACT

A gel composition that is the combination of or reaction product of ingredients comprising a thermoplastic elastomer copolymer, a functionalized polyolefin, an extender, and optionally a fatty acid.

35 Claims, No Drawings

SOFT GEL COMPOSITIONS FOR HOT ADHESION

This application gains priority from U.S. Patent Application Ser. No. 60/269,138 filed on Feb. 15, 2001.

BACKGROUND OF THE INVENTION

Disk drive assemblies for computers typically include a magnetic storage disk coaxially mounted about a spindle apparatus that rotates at speeds in excess of several thousand revolutions per minute (RPM). The disk drive assemblies also include a magnetic head that writes and reads information to and from the rotating magnetic storage disk. The magnetic head is usually disposed at the end of an actuator arm and is positioned in a space above the magnetic disk. The actuator arm can move relative to the magnetic disk. The disk drive assembly is mounted on a disk base (support) plate and sealed with a cover plate to form a housing that protects the disk drive assembly from contamination.

Serious damage to the magnetic disks, including loss of valuable information, can result from gaseous and particulate contaminants in the disk drive assembly housing. To prevent or substantially reduce introduction of such contaminants into the disk drive housing, a flexible sealing gasket is disposed between the mounting plate and the cover plate. The sealing gaskets typically are prepared by punching annular disks from a sheet of cured elastomer.

Such gaskets typically are adhered or mechanically attached, e.g., affixed with screws, to the support plate. Being able to eliminate these types of separate chemical or mechanical attachment means by providing a self-securing gasket would be highly desirable.

SUMMARY OF THE INVENTION

In general the present invention provides a gel composition that is the combination of or reaction product of ingredients comprising a thermoplastic elastomer copolymer, a functionalized polyolefin, an extender, and optionally a fatty acid.

The present invention also includes a gasket formed by melt extruding a composition that is the combination or reaction product of ingredients comprising a thermoplastic elastomer copolymer, a functionalized polyolefin, an extender, and optionally a fatty acid.

The present invention further provides a disk drive assembly for computers comprising a gasket formed by melt extruding a composition that is the combination or reaction product of ingredients comprising a thermoplastic elastomer copolymer, a functionalized polyolefin, an extender, and optionally a fatty acid.

The soft gel compositions of this invention are advantageously thermoreversible, and therefore they can be applied by hot injection molding or melt extruding. Also, these compositions can be recycled. Further, the unique combination of materials employed within the composition provides for a material that has excellent adhesive characteristics, especially to metals and plastics, and very low gas permeability. Accordingly, gaskets made from the composition of this invention can be directly applied to a metal or plastic surface via heat molding. The gaskets advantageously greatly reduce the intrusion of gases and airborne contaminants into devices such as disk drive assemblies.

DETAILED DESCRIPTION OF ILLUSTRATIVE EMBODIMENTS

The gel compositions include a blend of a thermoplastic elastomer copolymer, a functionalized polyolefin, an extender, and, optionally, a fatty acid. These compositions are soft and thermoreversible gels that have been found to exhibit good hot adhesion to metal and plastic substrates.

Useful thermoplastic elastomer copolymers include, but are not limited to, styrene/butadiene rubber (SBR), styrene/isoprene rubber (SIR), styrene/isoprene/butadiene rubber (SIBR), styrene-butadiene-styrene block copolymer (SBS), hydrogenated styrene-butadiene-styrene block copolymer (SEBS), hydrogenated styrene-butadiene block copolymer (SEB), styrene-isoprene-styrene block copolymer (SIS), styrene-isoprene block copolymer (SI), hydrogenated styrene-isoprene block copolymer (SEP), hydrogenated styrene-isoprene-styrene block copolymer (SEPS), styrene-ethylene/butylene-ethylene block copolymer (SEBE), styrene-ethylene-styrene block copolymer (SES), ethylene-ethylene/butylene block copolymer (EEB), ethylene-ethylene/butylene/styrene block copolymer (hydrogenated BR-SBR block copolymer), styrene-ethylene/butylene-ethylene block copolymer (SEBE), ethylene-ethylene/butylene-ethylene block copolymer (EEBE) and mixtures thereof.

Preferred copolymers include hydrogenated styrene-butadiene-styrene block copolymer (SEBS) and hydrogenated styrene-isoprene-styrene block copolymer (SEPS). The preferred copolymers are commercially available under the tradename SEPTON (Kuraray; New York, N.Y.). A hydrogenated block copolymer can be obtained by hydrogenating a block copolymer that includes at least two polymer blocks A composed mainly of a vinyl-substituted aromatic hydrocarbon and at least one polymer block B composed mainly of a conjugated diene, where "composed mainly of" refers to a plurality of the mer units of the polymer or segment resulting from the polymerization of the indicated monomer.

The hydrogenated block copolymer can have a polymer structure represented by such formulae as, for example, $(A-B-)_nA$, $(B-A-B-)_nA$, $(B-A-B-)_nA-B$, $(A-B-)_mX$, $(B-A-B-)_mX$, etc., where n is an integer of 1 or more, m is an integer of 2 or more, and X represents a coupling or polyfunctional initiator residue having two or more functional groups.

The hydrogenated block copolymer can compose from about 5 to 60 wt. %, preferably 10 to 50 wt. %, of a vinyl-substituted aromatic hydrocarbon. Polymer block A, composed mainly of a vinyl-substituted aromatic hydrocarbon, has the structure of a homopolymer block of a vinyl-substituted aromatic hydrocarbon or a copolymer block of a vinyl-substituted aromatic hydrocarbon containing more than 50 wt. %, and preferably not less than 70 wt. %, of vinyl-substituted aromatic hydrocarbon with a hydrogenated conjugated diene. Polymer block B, composed mainly of a hydrogenated conjugated diene, has the structure of a homopolymer block of a hydrogenated conjugated diene or a copolymer block of a hydrogenated conjugated diene containing more than 50 wt. %, and preferably not less than 70 wt. %, of hydrogenated conjugated diene with a vinyl-substituted aromatic hydrocarbon. Also, as to the distribution of the hydrogenated conjugated diene or the vinyl-substituted aromatic hydrocarbon contained in the molecular chains of blocks A and B, both polymer blocks may take any of random, tapered (the monomer components increase or decrease along the molecular chain) and partial block arrangements and, when the numbers of either of both of blocks A and B are 2 or more, the structures of the respective individual blocks may be the same or different.

The hydrogenated block copolymer, in one embodiment, has a number average molecular weight ($M_n$) of about 100,000 to about 1,000,000, preferably about 125,000 to about 800,000, more preferably about 150,000 to about 500,000. The molecular weight distribution ($M_w/M_n$) is preferably 10 or less. The molecular structure type of the hydrogenated block copolymer may be selected from straight-chain, branched-chained involving partial coupling with a coupling agent, radial, and the star-shaped types and combinations thereof.

Hydrogenated block copolymers can be obtained by synthesizing a vinyl-substituted aromatic hydrocarbon/conjugated diene block copolymer in an inert solvent using an organo-lithium and if necessary, a 1,2-vinyl bond modifier such as ether compounds, tertiary amines, etc., (See, e.g., British Patent No. 1,130,770 and U.S. Pat. Nos. 3,281,383 and 3,639,517) and then hydrogenating the resulting block copolymer (See, e.g., British Patent No. 1,020,720 and U.S. Pat. Nos. 3,333,024 and 4,501,857). The polymer block composed mainly of the conjugated diene can be changed in form to the polymer block of an olefinic compound by hydrogenating at least 80 mole % of the aliphatic double bonds coming from the conjugated diene of the vinyl-substituted aromatic hydrocarbon/conjugated diene block copolymer.

Also, although the hydrogenation ratio of the aromatic double bond coming from polymer block A and/or the vinyl-substituted aromatic hydrocarbon incorporated as a co-monomer, as need arises, in the polymer block B is not critical, it preferably is 20 mole % or less.

The functionalized polyolefin additive includes an α-olefin polymer that contains terminal or pendent moieties containing acid, anhydride, hydroxyl, imide, amine or amide groups.

The terminal or pendent moieties preferably derive from unsaturated carboxylic acids or unsaturated anhydrides. Examples of unsaturated carboxylic acids include citraconic acid, cinnamic acid, methacrylic acid, and itaconic acid. Examples of unsaturated anhydrides include maleic anhydride, citraconic anhydride, and itaconic anhydride. The preferred terminal or pendent moieties are succinic anhydride groups, or the corresponding acid from a ring opening structure, that derives from maleic anhydride.

The α-olefin polymer includes an α-olefin homopolymer, a copolymer of two or more α-olefins, or a copolymer of an α-olefin with a compatible monomer. The α-olefins can include from about 2 to about 8 carbon atoms, and more preferably from 3 to about 5 carbon atoms. Exemplary α-olefin monomers include ethylene, propylene, butene-1, and pentene-1. Exemplary monomers that can be copolymerized with α-olefins include vinyl aromatic monomers and diene monomers. An exemplary copolymer is poly (propylene-co-ethylene) that contains polyethylene crystals.

The functionalized polyolefins should contain from about 0.01 to about 3 Parts by weight (pbw) of the functional moiety based upon the weight of the entire polymer. More preferably, the modified polyolefin should contain from about 0.1 to about 2 pbw of the functional moiety, an even more preferably from about 0.15 to about 1.0 pbw of the functional moiety.

The weight average molecular weight of the functionalized polyolefins can vary greatly, although it is preferred that the weight average molecular weight ($M_w$) be from about 1,000 to about 500,000, more preferably from about 1,500 to about 100,000, even more preferably from about 2,000 to about 50,000, and still more preferably about 3,000 as determined by using standard GPC analysis with polystyrene as a standard. Preferably, the molecular weight distribution ($M_w/M_n$) should be less than about 4.5, preferably less than about 4.0, and even more preferably less than about 3.8.

The functionalized polyolefin additives are typically prepared by grafting unsaturated carboxylic acids or unsaturated anhydrides to a polyolefin polymer.

The techniques employed to attach the terminal or pendent moieties that contain carboxylic acid or anhydride groups to a polyolefin polymer are well known in the art. For example, grafting maleic anhydride to a polyolefin is disclosed in U.S. Pat. No. 6,046,279, which is incorporated herein by reference.

The α-olefin polymers can be synthesized by using a number of polymerization techniques such as, but not limited to, the "Phillips catalyzed reactions" conventional Ziegler-Natta type polymerizations, and metallocene catalysis including, but not limited to, metallocene-aluminoxane and metallocene-ionic activator catalysis.

Exemplary α-olefin polymers include polyethylene, polypropylene, poly(ethylene-co-propylene), poly(propylene-co-butene-1), and poly(butene-1-co-ethylene). These α-olefin polymers can be either amorphous, semi-crystalline, or crystalline polymers. The preferred polyolefins include crystalline or stereoregular polypropylene. Most polypropylene homopolymers that are commercially produced have an isotactic microstructure. The poly(propylene-co-ethylene) copolymers can be random or block copolymers. Preferably, these copolymers will contain some polyethylene crystals, although they should include a major amount of propylene units and only a minor amount of ethylene units. Preferably, these copolymers should contain less than about 40 percent by weight (pbw) ethylene units, more preferably from about 1 to about 30 pbw ethylene units, and more preferably from about 1.5 to about 25 pbw ethylene units.

Functionalized polyolefins are commercially available. For example, maleic anhydride functionalized polypropylene is available under the tradename EXXELOR™ PO1015 & 1020 (Exxon Mobil Chemical Company; Houston, Tex.), under the tradename PP-C™, CA1000, or 18707 (Elf Atochem; Philadelphia, Pa.), or under the tradename Polybond™ 3001, 3002, or 3150 (Uniroyal Chemical Company; Middlebury, Conn.).

Useful extenders include oils or low molecular weight organic compounds. Without intending to be bound to any particular theory, the extender is believed to interact with the thermoplastic elastomer copolymer and increase the distance between the thermoplastic blocks or domains thereof, thereby forming an extended or soft gel composition.

Suitable oils include naphthenic, aromatic, paraffinic, phthalic, and silicone oils. A preferred extender oil is paraffinic oil. Preferably, the extender oils have a $M_w$ from about 100 to about 10,000.

Examples of low molecular weight organic compounds include organic materials having a $M_n$ of less than 20,000, preferably less than 10,000, and most preferably less than 5,000. Suitable low molecular weight compounds include softening agents, plasticizers, oligomers, liquid polymers and copolymers, lubricants, and low molecular weight petroleum products. Other appropriate low-molecular organic materials include latexes, emulsions, liquid crystals, bituminous compositions, and phosphazenes. One or more of these materials may be used as extenders.

Exemplary softening agents include aromatic, naphthenic, and paraffinic softening agents, which are commonly used in rubbers or resins.

Exemplary plasticizers include phthalic esters, mixed phthalic esters, aliphatic dibasic acid esters, glycol esters, fatty acid esters, phosphoric esters, stearic esters, epoxy esters, phthalate esters, adipate esters, sebacate esters, phosphate esters, polyether and polyester plasticizers, which are commonly used with nitrile rubber.

Exemplary tackifiers include coumarone resins, coumarone-indene resins, terpene phenol resins, petroleum hydrocarbons, and rosin derivatives.

Exemplary oligomers include crown ether, fluorine-containing oligomers, polybutenes, xylene resins, chlorinated rubber, polyethylene wax, petroleum resins, rosin ester rubber, polyalkylene glycol diacrylate, liquid rubber (polybutadiene, styrene/butadiene rubber, butadiene-acrylonitrile rubber, polychloroprene, etc.), silicone oligomers, and poly-α-olefins.

Exemplary lubricants include hydrocarbon lubricants such as paraffins and waxes, fatty acid lubricants such as higher fatty acids and hydroxy-fatty acids, fatty acid amide lubricants such as fatty acid amides and alkylene-bis-fatty acid amides, ester lubricants such as fatty acid-lower alcohol esters, fatty acid-polyhydric alcohol esters and fatty acid-polyglycol esters, alcoholic lubricants such as fatty alcohols, polyhydric alcohols, polyglycols and polyglycerols, metallic soaps, and mixed lubricants.

Exemplary petroleum products include synthetic terpene resins, aromatic hydrocarbon resins, aliphatic hydrocarbon resins, aliphatic cyclic hydrocarbon resins, aliphatic or alicyclic petroleum resins, aliphatic or aromatic petroleum resins, polymers of unsaturated hydrocarbons, and hydrogenated hydrocarbon resins.

The gel compositions may optionally include a fatty acid, particularly a mono-functional, di-functional, and multi-functional fatty acid. Preferred fatty acids have 1 to about 60 carbon atoms, more preferably about 3 to about 40 carbon atoms, and more preferably about 5 to about 20 carbon atoms.

Suitable fatty acids include mono-functional fatty acids such as octanic acid, nonanoic acid, decanoic acid, lauric acid, myristic acid, palmitic acid, and stearic acid, and di-functional fatty acids such as suberic acid, sebacic acid, dodecandioic acid, hexadecane-dioic acid, and 5-(octadecyloxy)isophthalic acid.

The fatty acid preferably has attached thereto 1 to about 10, more preferably from about 1 to about 5, and most preferably from about 1 to about 4 carboxyl groups. Mono-functional fatty acids, such as stearic acid, are particularly preferred.

The gel composition may also include other additives such as, for example, fillers, shrinkage inhibiting agents, and pigments.

Suitable fillers include both organic and inorganic fillers. Preferred organic fillers include carbon black. Preferred inorganic fillers include silica, alumina, aluminum hydroxide, magnesium hydroxide, and various clays. Fillers are typically employed in amount from about 5 to about 30 pbw per 100 pbw of thermoplastic elastomer.

Useful shrinkage inhibiting agents include crystalline polyolefins. Suitable crystalline polyolefins include polyethylene and polypropylene. Crystalline polyolefins are typically used in amount from about 5 to about 20 pbw per 100 pbw of thermoplastic elastomer copolymer.

The gel compositions preferably include about 1 to about 100 pbw functionalized polyolefin, about 1 to about 1,000 pbw extender, and 0 to about 100 pbw fatty acid per 100 pbw thermoplastic elastomer copolymer. More preferably, the gel compositions include about 10 to about 90 pbw functionalized polyolefin, about 50 to about 500 pbw extender, and about 5 to about 50 pbw fatty acid per 100 pbw thermoplastic elastomer copolymer. Even more preferably, the gel compositions include about 50 to about 80 pbw functionalized polyolefin, about 200 to about 400 pbw extender, and about 15 to about 40 pbw fatty acid per 100 pbw thermoplastic elastomer copolymer.

The soft gel compositions are formed by combining or mixing the thermoplastic elastomer copolymer, functionalized polyolefin, extender, and optional fatty acid. The extender is preferably added during final processing. While the soft gel composition is believed to result from the mere combination of these components, the degree of interaction or reaction between the various components is not known with any great degree of certainty. The term soft gel composition, therefore, is intended to encompass a simple mixture or blend of the components, a complex of the three components that results from physical or chemical forces of attraction, a chemical reaction products of the components, or a combination of the foregoing.

Solid state mixing of the ingredients may be performed in an internal or external mixer. Mixing may also be conducted in solution with an appropriate solvent. Useful solvents include organic solvents, preferably hydrocarbon solvents, and most preferably aliphatic solvents. Solid state mixing can occur at a temperature from about 100° to about 250° C., preferably from about 140° to about 230° C., and more preferably from about 150° to about 200° C.

Once prepared, the soft gel compositions of this invention are thermoreversible and therefore may be employed to produce various articles via melt extruding or injection molding. This extrusion or molding preferably occurs at a temperature from about 160 to about 250° C.

The soft gel compositions preferably have a Shore A hardness of less than about 35. They exhibit excellent thermostability, as evidenced by a compression set at 100° C. of less than about 60.

The gel composition and articles made therefrom exhibit excellent adhesion to metal and plastic substrates under the conditions of quick hot contact. The adhesion of the gel composition to metal and plastic surfaces eliminates the need for an adhesive to adhere the material to the substrate. In addition, the soft gel composition can be recycled and reused.

Because of its propensity to strongly adhere to metal and plastic surfaces, the gel composition can be utilized to prepare gaskets for disk drives, CD-ROM drives, DVD-ROM drives for microcomputers, gaskets for cellular telephones and the like. For example, a mounting plate for a disk drive assembly may include a substrate with a sealing gasket adhered thereto, with the sealing gasket being prepared from the gel composition of this invention.

The gel composition can be formed into a sealing gasket of any desired shape and easily attached to a base support plate via direct injection molding. These sealing gaskets have improved hardness, tensile strength, compression set, and excellent thermostability and flexibility. They also substantially prevent the introduction of gaseous and particulate contaminants into the disk drive housing.

Sealing gaskets made from the extended gel composition exhibit excellent adhesion to metal and plastic surfaces. In particular, the sealing gaskets show excellent adhesion to metal substrates such as, but not limited to, aluminum, iron, copper, and nickel surfaces. The gaskets also exhibit particularly good adhesion to nickel-coated metal surfaces such as, but not limited to, nickel-coated aluminum substrates.

The sealing gaskets made from of the inventive soft gel compositions are self-adhering or self-securing to metal and plastic surfaces under conditions of hot direct injection molding, and thereby eliminate the need for expensive machining of holes, interlocking recesses, or continuous grooves in the base support plate, which are used to secure the sealing gasket to the substrate. The sealing gasket material may be stripped from the surface of a base support plate and the soft gel composition recycled for further use.

In order to demonstrate the practice of the present invention, the following examples have been prepared and tested. The examples should not, however, be viewed as limiting the scope of the invention. The claims will serve to define the invention.

EXAMPLES

Example 1 (Comparative)

A mixture of 52.5 g SEPS and 162.5 g paraffin oil was allowed to sit for about 30 minutes in an aluminum pan at room temperature (23° C.). This was charged into a 300 g capacity Brabender mixer equipped with a Banbury blade and $N_2$ purging. The mixer was initially set at 180° C. and 60 RPM. After 20 minutes of mixing, agitation was terminated and the mixture was removed from the mixer.

The resulting soft gel exhibited a high compression set and a low Shore A hardness but did not adhere to either aluminum or plastic surfaces.

Example 2 (Comparative)

A 35 g sample of polypropylene was added to the mixer from Comparative Example 1, which was initially set to 180° C. and 60 RPM. After 5 minutes of mixing, the mixture from Comparative Example 1 above was added slowly to the mixer over a period of 5 minutes and mixed for an additional 10 minutes.

The resulting soft gel exhibited an improved compression set, Shore A hardness, and tensile strength relative to Comparative Example 1. However, it did not adhere to either aluminum or plastic surfaces.

Example 3

A 35 g sample of maleated polypropylene (ELF AtoChem) was added to the same mixer as described in Comparative Example 1, which was initially set as before. After 5 minutes of mixing, the mixture from Comparative Example 1 was added slowly to the mixer over a period of 5 minutes and mixed for an additional 10 minutes.

Example 4

Example 3 was repeated except that the maleated polypropylene used was obtained from another source (Sanyo Chem.; Japan).

Example 5

Example 4 was repeated except that, after the mixing, 12.5 g stearic acid (Aldrich Chemical Co.; Milwaukee, Wis.) was added to the mixer, and the material was mixed for an additional 4 minutes prior to removal.

Example 6

Example 5 was repeated except that 12.5 g 1,12-dodecanedicarboxylic was used instead of stearic acid.

Example 7

The gels of Examples 1–6 were molded into sheets and cylinder buttons at about 180° C. Ring samples were cut from the sheets for tensile measurements. The cylinder buttons were used for compression set measurements.

The peel test was carried out on aluminum and metallized polyester surfaces using standard test procedures. Specimens for the peel tests were prepared from sandwiching a compound between two aluminum or two metallized polyester films for 5 minutes at 160° C. and a pressure of about 34.5 MPa. The results of the tensile measurements, compression set measurements, and peel tests are shown in the following table.

TABLE I

|  | 1 | 2 | 3 | 4 | 5 | 6 |
|---|---|---|---|---|---|---|
| Compression Set at 100° C. (%) | 73.7 | 50.1 | 55.9 | 50.3 | 62.0 | 60.2 |
| Tensile Strength at break (MPa) | 1.05 | 2.67 | 1.37 | 1.08 | 1.32 | 0.88 |
| Elongation at Break (%) | 1214 | 707 | 601 | 739 | 734 | 591 |
| Shore A Hardness | 4 | 35 | 27 | 20 | 25 | 19 |
| Peel load on Al, (N over 2.54 cm) | | | | | | |
| Maximum | | 2.32 | 1.10 | 11.8 | 5.44 | 7.55 | 5.05 |
| Average | | 1.66 | 0.40 | 8.24 | 4.56 | 5.13 | 4.23 |
| Peel load on MP*, (N over 2.54 cm) | | | | | | |
| Maximum | | 2.35 | 0.60 | 0.97 | 3.32 | 9.68 | 4.91 |
| Average | | 1.43 | 0.37 | 0.69 | 2.73 | 7.07 | 4.35 |

*MP = metallized polyester

The extended gel compositions of Examples 3–6 were soft, thermoreversible gels.

As shown by Examples 3 and 4, addition of maleated-polypropylene to SEPS improves the tensile strength and hardness of the gel compositions, as compared to those compositions not containing functionalized polyolefin. Additionally, the gel compositions of Examples 3 and 4 exhibited excellent adhesion to aluminum surfaces.

In Example 5, the gel composition included a monofunctional fatty acid, namely stearic acid. In Example 6, the gel composition included a di-functional fatty acid, namely 12-dodecanedicarboxylic acid. These gel compositions exhibited good adhesion to both aluminum and plastic surfaces.

Various modifications and alterations that do not depart from the scope and spirit of this invention will become apparent to those skilled in the art. This invention is not to be duly limited to the illustrative embodiments set forth herein.

The invention claimed is:

1. A gel composition that is the combination of or reaction product of ingredients comprising:
   a thermoplastic elastomer copolymer selected from the group consisting of styrene/butadiene rubber (SBR), styrene/isoprene rubber (SIR), styrene/isoprene/butadiene rubber (SIBR), styrene-butadiene-styrene block copolymer (SBS), hydrogenated styrene-butadiene-styrene block copolymer (SEBS), hydrogenated styrene-butadiene block copolymer (SEB), styrene-isoprene-styrene block copolymer (SIS), styrene-isoprene block copolymer (SI), hydrogenated styrene-isoprene block copolymer (SEP), hydrogenated styrene-isoprene-styrene block copolymer (SEPS), styrene-ethylene/butylene-ethylene block copolymer (SEBE), styrene-ethylene-styrene block copolymer (SES), ethylene-ethylene/butylene block copolymer (EEB), ethylene-ethylene/butylene/styrene block copolymer (hydrogenated BR-SBR block copolymer), styrene-ethylene/butylene-ethylene block copolymer (SEBE), styrene-ethylene/propylene-styrene copolymer, ethylene-ethylene/butylene-ethylene block copolymer (EEBE) and mixtures thereof;

about 1 to about 100 parts by weight of a functionalized polyolefin per 100 parts by weight of said thermoplastic elastomer copolymer;

about 1 to about 1,000 parts by weight of an extender per 100 parts by weight of said thermoplastic elastomer; and about 5 to about 100 parts by weight of a fatty acid per 100 parts by weight of said thermoplastic elastomer.

2. The composition of claim 1, where the ingredients comprise about 10 to about 90 parts by weight of said functionalized polyolefin per 100 parts by weight of said thermoplastic elastomer copolymer, from about 50 to about 500 parts by weight of said extender per 100 parts by weight of said thermoplastic elastomer, and about 5 to about 50 parts by weight of said fatty acid per 100 parts by weight of said thermoplastic elastomer.

3. The composition of claim 1, where the ingredients comprise about 50 to about 80 parts by weight of said functionalized polyolefin per 100 parts by weight of said thermoplastic elastomer copolymer, from about 200 to about 400 parts by weight of said extender per 100 parts by weight of said thermoplastic elastomer, and about 15 to about 40 parts by weight of said fatty acid per 100 parts by weight of said thermoplastic elastomer.

4. The composition of claim 1, where said thermoplastic elastomer copolymer is a styrene-ethylene/butylene-styrene copolymer, a styrene-ethylene/propylene-styrene copolymer, or mixture thereof.

5. The composition of claim 1, where said extender is an oil or low molecular weight organic compound.

6. The composition of claim 5, where said oil is a naphthenic, aromatic, paraffinic, phthalic, or silicone oil.

7. The composition of claim 1, where said functionalized polyolefin includes an α-olefin polymer that contains terminal or pendent moieties containing acid or anhydride groups.

8. The composition of claim 7, where said functionalized polyolefin includes terminal or pendent moieties deriving from maleic anhydride, citraconic anhydride, and itaconic anhydride.

9. The composition of claim 1, where said functionalized polyolefin includes a polypropylene backbone.

10. The composition of claim 1, where said functionalized polyolefin includes a backbone deriving from ethylene and propylene.

11. The composition of claim 1, where said fatty acid includes a multi-functional fatty acid.

12. The composition of claim 11, where said multi-functional fatty acid includes suberic acid, sebacic acid, dodecandioic acid, hexadecane-dioic acid, or 5-(octadecyloxy)isophthalic acid.

13. The composition of claim 1, where the gel composition is formed by mixing said thermoplastic elastomer copolymer, said functionalized polyolefin, said extender, and said fatty acid in the solid state.

14. The composition of claim 1, where the ingredients comprise styrene-ethylene/propylene-styrene copolymer, maleated polypropylene, paraffin oil, and 1,12-dodecanedicarboxylic acid or stearic acid.

15. A gasket formed by melt extruding the composition of claim 1.

16. A disk drive assembly for computers comprising a gasket formed by melt extruding the composition of claim 1.

17. The composition of claim 1, where said fatty acid includes a mono-functional fatty acid, a di-functional fatty acid, or a multi-functional fatty acid.

18. The composition of claim 1, where said fatty acid includes from about 1 to about 10 carboxyl groups.

19. The composition of claim 17, where said fatty acid is selected from the group consisting of octanic acid, nonanoic acid, decanoic acid, lauric acid, myristic acid, palmitic acid, stearic acid, di-functional fatty acids, suberic acid, sebacic acid, dodecandioic acid, hexadecane-dioic acid, and 5-(octadecyloxy)isophthalic acid.

20. A gel composition that is the combination of or reaction product of ingredients comprising:

a thermoplastic elastomer copolymer selected from the group consisting of styrene/butadiene rubber (SBR), styrene/isoprene rubber (SIR), styrene/isoprene/butadiene rubber (SIBR), styrene-butadiene-styrene block copolymer (SBS), hydrogenated styrene-butadiene-styrene block copolymer (SEBS), hydrogenated styrene-butadiene block copolymer (SEB), styrene-isoprene-styrene block copolymer (SIS), styrene-isoprene block copolymer (SI), hydrogenated styrene-isoprene block copolymer (SEP), hydrogenated styrene-isoprene-styrene block copolymer (SEPS), styrene-ethylene/butylene-ethylene block copolymer (SEBE), styrene-ethylene-styrene block copolymer (SES), ethylene-ethylene/butylene block copolymer (EEB), ethylene-ethylene/butylene/styrene block copolymer (hydrogenated BR-SBR block copolymer), styrene-ethylene/butylene-ethylene block copolymer (SEBE), styrene-ethylene/propylene-styrene copolymer, ethylene-ethylene/butylene-ethylene block copolymer (EEBE) and mixtures thereof;

a functionalized polyolefin;

an extender; and a multi-functional plastic fatty acid.

21. The composition of claim 20, where the ingredients comprise about 10 to about 90 parts by weight of said functionalized polyolefin per 100 parts by weight of said thermoplastic elastomer copolymer, from about 50 to about 500 parts by weight of said extender per 100 parts by weight of said thermoplastic elastomer, and about 5 to about 50 parts by weight of said fatty acid per 100 parts by weight of said thermoplastic elastomer.

22. The composition of claim 20, where the ingredients comprise about 50 to about 80 parts by weight of said functionalized polyolefin per 100 parts by weight of said thermoplastic elastomer copolymer, from about 200 to about 400 parts by weight of said extender per 100 parts by weight of said thermoplastic elastomer, and about 15 to about 40 parts by weight of said fatty acid per 100 parts by weight of said thermoplastic elastomer.

23. The composition of claim 20, where said thermoplastic elastomer copolymer is a styrene-ethylene/butylene-styrene copolymer, a styrene-ethylene/propylene-styrene copolymer, or mixture thereof.

24. The composition of claim 20, where said extender is an oil or low molecular weight organic compound.

25. The composition of claim 24, where said oil is a naphthenic, aromatic, paraffinic, phthalic, or silicone oil.

26. The composition of claim 20, where said functionalized polyolefin includes an α-olefin polymer that contains terminal or pendent moieties containing acid or anhydride groups.

27. The composition of claim 26, where said functionalized polyolefin includes terminal or pendent moieties deriving from maleic anhydride, citraconic anhydride, and itaconic anhydride.

28. The composition of claim 20, where said functionalized polyolefin includes a polypropylene backbone.

29. The composition of claim 20, where said functionalized polyolefin includes a backbone deriving from ethylene and propylene.

30. The composition of claim 29, where said multifunctional fatty acid includes suberic acid, sebacic acid, dodecandioic acid, hexadecane-dioic acid, or 5-(octadecyloxy)isophthalic acid.

31. The composition of claim 20, where the gel composition is formed by mixing said thermoplastic elastomer copolymer, said functionalized polyolefin, said extender, and said fatty acid in the solid state.

32. A gasket formed by melt extruding the composition of claim 20.

33. A disk drive assembly for computers comprising a gasket formed by melt extruding the composition of claim 20.

34. The composition of claim 20, where the ingredients comprise about 1 to about 100 parts by weight of said functionalized polyolefin per 100 parts by weight of said thermoplastic elastomer copolymer, from about 1 to about 1,000 parts by weight of said extender per 100 parts by weight of said thermoplastic elastomer, and about 5 to about 100 parts by weight of said fatty acid per 100 parts by weight of said thermoplastic elastomer.

35. A gel composition that is the combination of or reaction product of ingredients comprising:

a styrene-ethylene/propylene-styrene copolymer, maleated polypropylene, paraffin oil, and 1,12-dodecanedicarboxylic acid or stearic acid.

* * * * *